(12) United States Patent
Toshin et al.

(10) Patent No.: US 8,658,275 B2
(45) Date of Patent: Feb. 25, 2014

(54) SURFACE-TREATED METAL PLATE (75) Inventors: Kunihiko Toshin, Tokyo (JP); Kohei Ueda, Tokyo (JP)

(73) Assignee: Nippon Steel & Sumitomo Metal Corporation, Tokyo (JP)

(*) Notice: Subject to any disclaimer, the term of this patent is extended or adjusted under 35 U.S.C. 154(b) by 0 days.

(21) Appl. No.: 13/319,251

(22) PCT Filed: May 6, 2010

(86) PCT No.: PCT/JP2010/058074
§ 371 (c)(1),
(2), (4) Date: Nov. 7, 2011

(87) PCT Pub. No.: WO2010/128684
PCT Pub. Date: Nov. 11, 2010

(65) Prior Publication Data
US 2012/0064316 A1    Mar. 15, 2012

(30) Foreign Application Priority Data
May 8, 2009 (JP) ................................. 2009-113903

(51) Int. Cl.
B32B 7/02    (2006.01)
(52) U.S. Cl.
USPC ......................................... 428/212; 428/220
(58) Field of Classification Search
USPC ...................................... 428/212, 220, 411.1
See application file for complete search history.

(56) References Cited

U.S. PATENT DOCUMENTS
2009/0246472 A1    10/2009    Kanai et al.

FOREIGN PATENT DOCUMENTS

| CN | 101253001 A | 8/2008 |
|----|-------------|--------|
| JP | 6-145392 A | 5/1994 |
| JP | 2007-111988 A | 5/2007 |

OTHER PUBLICATIONS

Kanai et al (JP 2007-111988 machine translation), May 2007.*
International Search Report for International Patent Application No. PCT/JP2010/058074, mailed on Aug. 17, 2010.

* cited by examiner

Primary Examiner — Maria Veronica Ewald
Assistant Examiner — Lawrence Ferguson
(74) Attorney, Agent, or Firm — Birch, Stewart, Kolasch & Birch, LLP (57) ABSTRACT An easily and inexpensively producible surface-treated metal plate which uses a continuous coating facility for a surface-treated metal plate to provide at least two coating layers. A surface-treated metal plate comprised of a metal sheet on one surface or both surfaces of which two or more coating layers of different ingredients of formulation are provided, which surface-treated metal plate is characterized in that a diffusion layer is formed at an interface part between a first coating layer as a top layer and a second coating layer directly under the first coating layer, wherein the ingredients of the first coating layer and the second coating layer are mixed in the diffusion layer, and in that $t/T$ is $0.2 \leq t/T \leq 0.8$ where a film thickness of said diffusion layer is "t" and a total film thickness of said diffusion layer, said first coating layer, and said second coating layer is "T".

8 Claims, 2 Drawing Sheets

SURFACE-TREATED METAL PLATE

TECHNICAL FIELD

The present invention relates to a surface-treated steel plate which comprises a multilayer coating which is excellent in coating adhesion which can be suitably used in the field of automobiles, the field of home electrical appliances, the field of building materials, etc., more particularly relates to a surface-treated metal plate which is excellent in interlayer adhesion of one coating layer and another coating layer without impairing the various functions of the coating layers which are laminated.

BACKGROUND ART

A surface-treated metal plate which is used for containers, automobiles, home electrical appliances, building materials, and various other applications is conventionally often treated to prevent rust by chromate using hexavalent chromate etc. Furthermore, the practice has also been to apply a 1 μm or so thin film coating made of an organic resin so as to impart a high degree of corrosion resistance, fingermark resistance, scratch resistance, lubricity, etc. for use or to further apply a coating over this for use.

However, in recent years, from the viewpoint of environmental protection, tough restrictions have been applied on the use of hexavalent chromate and other environmental load substances. For this reason, there has been active research on alternative technologies to chromate treatment. For example, PLT 1 discloses art relating to a surface-treated steel plate with lubricity where a urethane resin or other aqueous resin, organic lubricant, silane coupling agent, etc. are blended in the coating, while PLT 2 discloses art relating to chromate-free treated metal sheet or plated metal sheet made of mainly zinc and aluminum which is coated with a water-based resin containing a thiocarbonyl group-containing compound and phosphoric acid ions and, furthermore, an aqueous dispersion silica.

In such chromate treatment alternative technologies, in recent years, for the purpose of use for various applications and under tougher conditions, realization of corrosion resistance, design, workability, worked corrosion resistance, solvent resistance, alkali resistance, conductivity, wet adhesion, scratch resistance, and other numerous functions simultaneously at a higher level has been sought. To deal with such a demand, for example, PLT 3 discloses the art of applying a cross-linked resin matrix coating which decreases the carboxyl acid groups and instead introduces hydroxyl groups so as to simultaneously impart alkali resistance, corrosion resistance, solvent resistance, and scratch resistance.

As art for simultaneously imparting several different functions in this way to a high level, a coated metal plate having a multilayer coating structure which divides the necessary functions among a plurality of coating layers has been proposed. As art which divides functions among a large number of layers in this way, for example, PLT 4 which provides a coating comprised of a top layer of an amine-modified phenol resin and a bottom layer of a silica-containing resin and which imparts corrosion resistance and top coating adhesion may be mentioned. In the case of the multilayer coating described in PLT 4, the interlayer adhesion of one coating layer and another coating layer is maintained by the chemical bonds between the coatings and the hydrogen bonds or the Van de Waals force and other physical bonds. However, in a multilayer structure aimed at division of functions, since coatings of different performances are laminated, the resin ingredients and additives differ and differences occur in the polarities and surface energies of the coatings. In this case, the physical bonding force between the coatings easily becomes extremely weak. Securing the interlayer adhesion of one coating layer and another coating layer becomes an issue. If the interlayer adhesion is insufficient, the workability, corrosion resistance, and other aspects of performance also can no longer be sufficiently exhibited. Further, blistering accompanying the corrosion and other defects in appearance become pronounced.

As art for improving the adhesion between coating layers of multilayer coatings, for example, as described in PLT 5, the art of introducing melamine to the bottom layer has been disclosed. However, it is generally known that melamine has a detrimental effect on performances other than adhesion, for example, workability.

Further, for example, PLT 6 discloses the art of using part of the thermoplastic resin particles which are dispersed in the bottom layer coating to form projections which penetrate to the inside of the top layer coating in wedge shapes so as to improve the interlayer adhesion between the bottom layer and the top layer. However, with this art, only the adhesion near the wedges formed by the thermoplastic resin particles is improved, so it is difficult to sufficiently obtain interlayer adhesion.

Further, for example, as described in PLT 7, the art is disclosed of simultaneously coating the top layer and the bottom layer by the multilayer coating method or the wet-on-wet method so as to use the anchor effect of the fine surface relief at the interface to improve the interlayer adhesion. However, the effect of improvement of the interlayer adhesion by the surface relief of the extent described in PLT 7 is slight. The necessary interlayer adhesion cannot be obtained.

PLT 8 discloses the art of applying a top layer of a specific composition in the state where a bottom layer has not completely cured (semicured state) and dissolving part of the bottom layer at the top layer so as to improve the interlayer adhesion. However, this art has the problem that it is also possible to utilize only a specific coating and lacks general applicability.

CITATION LIST

Patent Literature

PLT 1: Japanese Patent Publication (A) No. 2005-139477
PLT 2: Japanese Patent Publication (A) No. 11-29724
PLT 3: Japanese Patent Publication (A) No. 2005-281863
PLT 4: Japanese Patent Publication (A) No. 11-276987
PLT 5: Japanese Patent Publication (A) No. 2000-271538
PLT 6: Japanese Patent Publication (A) No. 2005-169648
PLT 7: WO2006/062214
PLT 8: Japanese Patent Publication (A) No. 2008-688

SUMMARY OF INVENTION

Technical Problem

Therefore, the present invention was made in consideration of the above situation in the prior art and provides an easily and inexpensively producible surface-treated metal plate which uses a continuous coating facility for surface-treated metal plate to provide at least two coating layers, which surface-treated metal plate is excellent in interlayer adhesion between one coating layer and a coating layer directly below it and has the coating performances of the two coating layers.

Solution to Problem

The inventors engaged in intensive studies to solve the above problems and as a result conceived of the present invention as explained below. The gist of the present invention is as follows.

(1) A surface-treated metal plate comprised of a metal sheet on one surface or both surfaces of which two or more coating layers of different ingredients of formulation are provided, which surface-treated metal plate is characterized in that a diffusion layer is formed at an interface part between a first coating layer as a top layer and a second coating layer directly under the first coating layer, wherein the ingredients of the first coating layer and the second coating layer are mixed in the diffusion layer, and in that t/T is $0.2 \leq t/T \leq 0.8$ where a film thickness of said diffusion layer is "t" and a total film thickness of said diffusion layer, said first coating layer, and said second coating layer is "T".

(2) A surface-treated metal plate as set forth in (1) characterized in that the t/T is $0.4 \leq t/T \leq 0.6$.

(3) A surface-treated metal plate as set forth in (1) or (2), characterized in that the total film thickness T is $1.0\ \mu m \leq T \leq 20.0\ \mu m$.

(4) A surface-treated metal plate as set forth in any one of (1) to (3), characterized in that the first coating layer has a film thickness of 0.2 μm or more.

(5) A surface-treated metal plate as set forth in any one of (1) to (4), characterized in that the second coating layer has a film thickness of 0.2 μm or more.

(6) A surface-treated metal plate as set forth in any one of (1) to (5), characterized in that the first coating layer and the second coating layer are formed by respectively different water-based coatings.

(7) A surface-treated metal plate as set forth in (6), characterized in that the water-based coatings are water-based dispersion coatings or emulsion coatings.

A surface-treated metal plate as set forth in (6) or (7), characterized in that the water-based coating includes a substance with a surfactant action.

(8) A surface-treated metal plate as set forth in any one of (1) to (7), characterized in that the second coating layer contains one or more types of rust preventing pigments comprised of compounds including at least one element which is selected from Si, P, and V and in that the first coating layer does not contain any compound including an element included in the second coating layer among Si, P, and V.

(9) A surface-treated metal plate as set forth in any one of (1) to (8), characterized in that the metal sheet is a zinc-based plated steel sheet.

(10) A method of production of a surface-treated metal plate as set forth in any of the above (1) to (9), the method of production of a surface-treated metal plate characterized by coating one surface or both surfaces of a metal sheet with a first coating which forms the first coating layer and a second coating which forms the second coating layer respectively by a wet-on-wet method or simultaneous multilayer coating method so as to form a diffusion layer at an interface part between said first coating layer and said second coating layer directly under the first coating layer of the front side of the sheet, wherein the ingredients of the first coating layer and the second coating layer are mixed in the diffusion layer and is characterized in that a difference ($\Delta\sigma=\sigma 2-\sigma 1$) between a surface tension ($\sigma 1$) at 20° C. of the first coating and a surface tension ($\sigma 2$) at 20° C. of the second coating which are measured by a platinum ring method is 2 to 20 mN/m and a difference ($\Delta\phi=\phi 2-\phi 1$) between a viscosity ($\phi 1$) at 20° C. of the first coating and a viscosity ($\phi 2$) at 20° C. of the second coating which are measured by a B-type viscometer is −10 to 200 mPa·s.

Advantageous Effects of Invention

According to the present invention, there is provided an easily and inexpensively producible surface-treated metal plate which uses a continuous coating facility for a surface-treated metal plate to obtain an excellent interlayer adhesion between a first coating layer and a second coating layer directly below the first coating layer which differ in ingredients of formulation and obtain the performances of the first coating layer and second coating layer.

DESCRIPTION OF EMBODIMENTS

Below, preferred embodiments of the present invention will be explained in detail while referring to the attached drawings.

(Coating Layer (Diffusion Layer))

A surface-treated metal plate according to an embodiment of the present invention is a surface-treated metal plate comprised of a metal sheet on one surface or both surfaces of which two or more coating layers of different ingredients of formulation are provided, which surface-treated metal plate is characterized in that a diffusion layer is formed at an interface part between a top layer (topmost layer) and bottom layer (layer directly under top layer), in which the ingredients of the top and bottom layers are mixed so that the concentrations of ingredients of the top and bottom layers continuously change and in that t/T is $0.2 \leq t/T \leq 0.8$ where a film thickness of the mixed layer (diffusion layer) is "t" and a total film thickness of the mixed layer (diffusion layer) and the coating layers of the top layer and bottom layer is "T". Note that, in the present embodiment, the "top layer" is one example of a first coating layer of the present invention, while the "bottom layer" is one example of a second coating layer of the present invention. Further, the bottom layer is formed at the side closer to the substrate to be surface-treated compared with top layer. In this way, for example, the bottom layer is formed at the surface-treated substrate side directly below the top layer.

The mixed layer (diffusion layer) according to this embodiment is a new layer in which the ingredients of the top layer and bottom layer are diffused with each other. It is characterized in that the ingredients of the top and bottom coating layers forming the mixed layer (diffusion layer) are included in amounts of 2 mass % or more.

This mixed layer (diffusion layer) can be formed by laminating the top layer-use coating and the bottom layer-use coating in a liquid state, the viscosities of the coatings are small, and, furthermore, changing of the surface tension by heating in the baking process. At the interface of the surface relief formed by a high viscosity solvent-based coating like as shown in PLT 7 or at the interface formed by the wet-on-wet method by coating a bottom layer and then superposing a top layer in a semisolidified state used in general in the automotive field etc., this mixed layer (diffusion layer) cannot be formed.

(Method of Measurement of Total Film Thickness)

The total film thickness T can be found by measurement of the actual coating film thicknesses. The method of measurement used may be any known method. For example, measurement by an electromagnetic thickness meter, the weight method of measuring the difference in weight before and after coating application and measuring the film thickness from the coating density, the corrosion method of stripping the coating by a corrosive solution and finding the value from the weight, time, production of gas, etc., the method of using an optical microscope, a scanning electron microscope (SEM), etc. to observe the cross-section and finding the value from the results etc. may be mentioned.

(Method of Measurement of Film Thickness of Top Layer, Bottom Layer, and Mixed Layer (Diffusion Layer))

The film thickness "t" of the mixed layer (diffusion layer) can be found by analyzing the state of distribution in the film thickness direction of the ingredients included in only one of the top layer or bottom layer. The method of analysis used may be any known analysis method. For example, X-ray probe microanalyzer or electron probe microanalyser (EPMA), X-ray photoelectron spectroscopy (XPS), Auger electron spectroscopy (AES), glow discharge spectroscopy (GDS), etc. may be utilized to analyze the distribution of concentration of elements in the depth direction of the coating or the coating cross-section may be analyzed to find the mixed layer (diffusion layer) film thickness "t" and top layer and bottom layer film thicknesses from the distribution of concentration of the ingredients covered. The types and methods of analysis of the ingredients used may be suitably selected in accordance with the film thickness, the amount of ingredients, etc. Aside from EPMA, XPS, AES, and GDS as well, any method which enables analysis of ingredients in the depth direction may be selected. As typical examples of the ingredients which can be used in analysis of the mixed layer (diffusion layer), Si, Ti, P, S, Ni, Zn, Al, V, Nb, etc. may be mentioned, but others are also possible.

Figure 1:
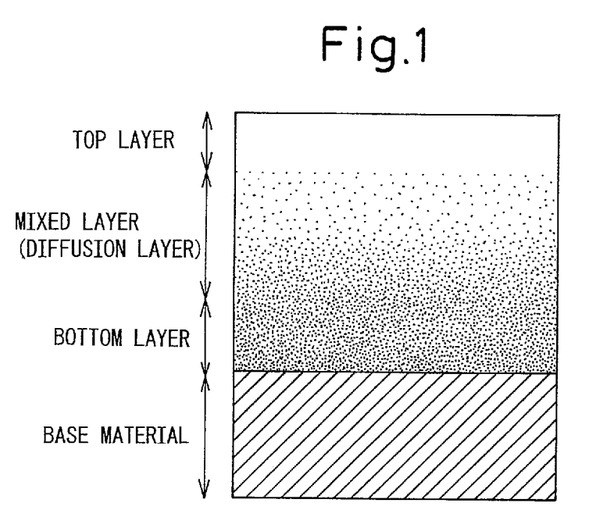
FIG. 1 is a cross-sectional conceptual view of a coating structure a surface-treated metal plate having a mixed layer (diffusion layer) according to an embodiment of the present invention.
Figure 2:
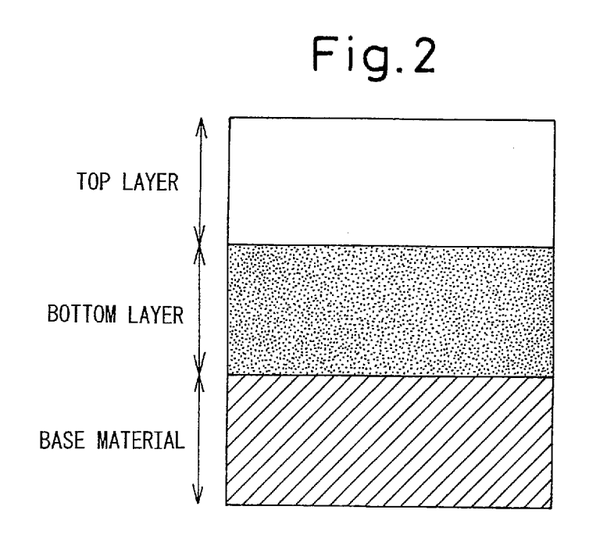
FIG. 2 is a cross-sectional conceptual view of a coating structure of a conventional surface-treated metal plate not having a mixed layer (diffusion layer).

As an example, it is possible to use a coating containing Si as the bottom layer coating and a coating not containing Si as the top layer coating to prepare a coating forming a mixed layer (diffusion layer) of the present invention and a conventional coating not having a mixed layer (diffusion layer). Conceptual drawings of the cross-sections are shown in FIG. 1 and FIG. 2. The distribution of Si concentration in the film thickness direction found by analysis of the Si in the coating depth direction by high frequency GDS are shown in FIG. 3 and FIG. 4.

Figure 3:
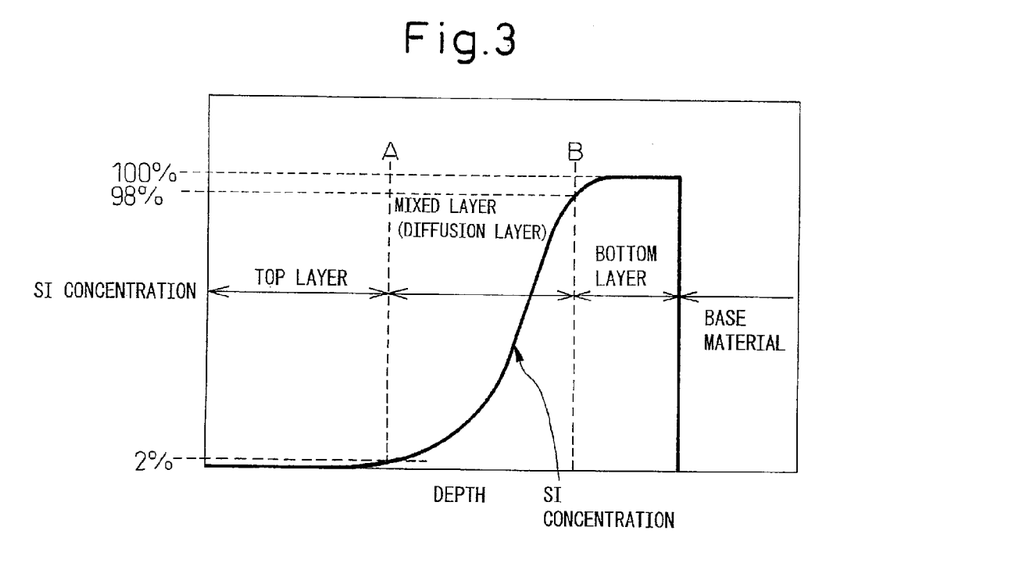
FIG. 3 is an explanatory view of the distribution of concentration of Si in a coating having a mixed layer (diffusion layer) of a surface-treated metal plate according to an embodiment of the present invention.
Figure 4:
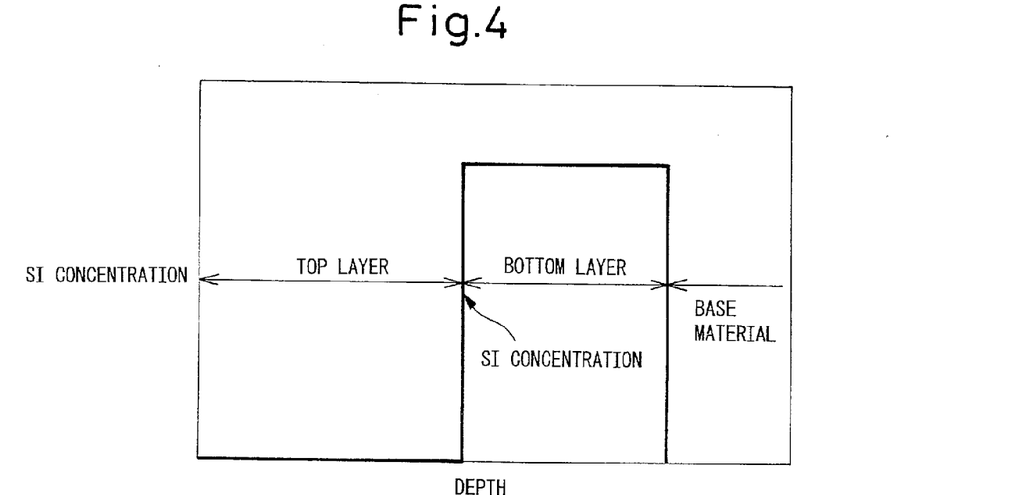
FIG. 4 is an explanatory view of the distribution of concentration of Si in a conventional coating not having a mixed layer (diffusion layer).

First, as shown in FIG. 3, the coating layer according to the embodiment of the present invention does not have any clear interface between the coating of the top layer with no Si and the coating of the bottom layer containing Si. The presence of a mixed layer (diffusion layer) in which the Si concentration continuously changes can be recognized. As opposed to this, as shown in FIG. 4, the conventional product does not exhibit a slanted structure of the Si concentration. An interface of the top layer and the bottom layer can be clearly recognized. Further, the mixed layer (diffusion layer) in the present embodiment has the ingredients of the laminated coatings diffused with each other. The ingredients of the two accounting for 2 mass % or more is a condition of the mixed layer (diffusion layer). Therefore, in the example shown in FIG. 3, the part between the A and the B where the concentration of Si changes from 2 mass % to 98 mass % of the bottom layer concentration becomes the mixed layer (diffusion layer).

Next, the method of formation of the mixed layer (diffusion layer) will be explained. The laminated coating films are adjusted in surface tension by addition of substances with surfactant actions at both the top and bottom layers. The surfactants in the laminated coating films form a molecular layer where hydrophobic parts are aligned at the interface part of the top layer and the bottom layer. Therefore, at the interface part of the top layer coating and bottom layer coating, the molecular layer of the top layer surfactant and the molecular layer of the bottom layer surfactant become film shapes facing each other through the respective hydrophobic parts (facing films), the interface becomes stable and a mixed layer (diffusion layer) can no longer be formed. The stability of the facing films is governed by the surface tension and viscosity of the laminated coatings. The difference ($\Delta\sigma=\sigma2-\sigma1$) of the surface tensions ($\sigma1$) of the top layer coating and bottom layer coating is controlled to become 2 to 20 mN/m, while the difference ($\Delta\phi=\phi2-\phi1$) of the bottom layer coating viscosity ($\phi2$) and the top layer coating viscosity ($\phi1$) is controlled to become −10 to 200 mPa·s. If deviating from these conditions, facing films are not formed and the interface becomes unstable, so layer defects where the top layer and the bottom layer completely mix easily are caused.

After forming a laminated coating having a stable interface by forming facing films in this way, the coating is dried and baked. Due to the heating for this drying and baking, the laminated coatings change in surface tension, the interface of the top layer coating and bottom layer coating becomes unbalanced in surface tension and the facing films break, so the ingredients of the top and bottom layers start to diffuse and a mixed layer (diffusion layer) is formed. Furthermore, by being heated and the solvent evaporating, the diffusion finishes. When the solvent completely evaporates and the coating forms, the diffusion stops.

When the interface of the top and bottom coating layer becomes unbalanced in surface tension, the diffusion start temperature becomes too low, and therefore the diffusion layer becomes too thick or a layer defect where the bottom layer coating becomes exposed at the surface of the top layer coating or other problem easily occurs, so the diffusion start temperature is preferably over 60° C.

The thickness of the diffusion layer depends on the temperature difference between the diffusion start temperature and diffusion end temperature and the rate of temperature rise between the two. By making this temperature difference 5 degrees to less than 40 degrees, it becomes possible to secure the necessary thickness of the diffusion layer under the heating and temperature raising conditions of the coating baking facilities used for general industrial production. From the viewpoint of more stable control of the thickness of the diffusion layer, the temperature difference between the diffusion start temperature and the diffusion end temperature is preferably 10 degrees to less than 40 degrees, more preferably is 20 degrees to less than 40 degrees.

The diffusion start temperature can be controlled by the type and amount of the solvent, the solid concentration, and the type and concentration of the surfactant, while the diffusion end temperature can be controlled by the type and amount of the solvent, the solid concentration, and the rate of temperature rise.

In this way, it is possible to control the diffusion layer by satisfying the conditions of the surface tension and viscosity of the above-mentioned coating and by setting the diffusion start temperature and end temperature to suitable ranges.

t/T is the ratio of the thickness of the mixed layer (diffusion layer) with respect to the total of the thicknesses of the mixed layer (diffusion layer) and the top and bottom layers combined, that is, the mixed layer (diffusion layer) and all layers relating to the formation of the mixed layer (diffusion layer). In the present embodiment, the range of $0.2 \le t/T \le 0.8$ is preferable, while the range of $0.4 \le t/T \le 0.6$ is more preferable.

If the thickness "t" of the mixed layer (diffusion layer) is a thin $0.2 > t/T$, the effect of improvement of the adhesion between layers of the mixed layer (diffusion layer) cannot be stably obtained. To obtain a stabler effect of improvement of the adhesion, it is preferable that $t/T \ge 0.4$.

On the other hand, if $t/T > 0.8$, that is, the mixed layer (diffusion layer) becomes too thick, it becomes difficult to sufficiently secure the thicknesses of the coatings of the top layer and bottom layer dividing the necessary functions between them. For this reason, when the top layer is the topmost layer, the thickness of the topmost layer easily becomes insufficient and the appearance becomes poor and otherwise maintaining the performances of the top layer coating and bottom layer coating themselves becomes difficult, the performance ends up becoming the same as that of a coating formed by a coating substantially mixing the top layer coating and bottom layer coating, and therefore the necessary inherent performances of the top layer film and bottom layer film cannot be obtained.

Further, by $t/\ge 0.4$, the thickness "t" of the mixed layer (diffusion layer) becomes more sufficient and the adhesion between layers can be improved more. Furthermore, to stably realize the division of functions of the top layer film or bottom layer film regardless of the type of the coating, the thickness "t" of the mixed layer (diffusion layer) is preferably $t/T \le 0.6$. That is, the thickness "t" of the mixed layer (diffusion layer) is more preferably $0.4 \le t/T < 0.6$.

In the present embodiment, it is preferable that the total film thickness T of the mixed layer (diffusion layer), top layer, and bottom layer be 20.0 μm or less. If the total film thickness T is greater than 20.0 μm, popping and other defects in appearance easily form due to the increase in the absolute amount of the nonvolatile ingredients, so this is unsuitable. If the total film thickness T is less than 1.0 μm, it becomes difficult to control the mixed layer (diffusion layer), it becomes impossible to substantially secure the film thicknesses necessary for the mixed layer (diffusion layer) and top layer and bottom layer, and securing the performance by division of functions among the layers becomes impossible.

The bottom layer preferably has a film thickness of 0.2 μm or more. If the top layer and bottom layer have film thicknesses of smaller than 0.2 μm, realization of the coating performances of the top and bottom layers becomes difficult. Sometimes the performance ends up becoming the same as a coating obtained by coating mixing a top layer coating and bottom layer coating.

The coating used in the present embodiment is preferably a water-based coating which is easy to adjust in the surface tension or viscosity. Furthermore, the above water-based coating is a water-based emulsion or dispersion coating. Since a resin is dispersed, the ingredients at the coating interface easily mutually disperse. It is easy to form a mixed layer (diffusion layer), so this is preferable.

If the bottom layer coating includes at least one element selected from Si, P, and V, the corrosion resistance is improved, so this is more preferable. For the Si, P, and V, it is possible to use any generally known compounds containing one or more of Si, P, and V. As examples of these, silica, aluminum phosphate, aluminum dihydrogen tripolyphosphate, magnesium dihydrogen phosphate, ammonium vanadate, vanadium oxide, etc. may be mentioned. If the top layer coating includes one or more elements selected from Si, P, and V, the alkali resistance sometimes falls, so when alkali resistance is required, this is preferably included in only the bottom layer coating. Further, these compounds may be used as reference substances for identifying the layer structure, so when adding these to the bottom layer coating, if not including a compound having as an ingredient an element included in the bottom layer among Si, P, and V, the layer structure can be easily identified, so this is preferable.

The metal sheet used in the present embodiment used may be a generally known metal material. The metal material may be an alloy material. For example, steel sheet, stainless steel sheet, aluminum sheet, aluminum alloy sheet, titanium sheet, steel sheet, etc. may be mentioned. The surfaces of these metal sheets may be plated. As the type of the plating, galvanization, aluminum plating, copper plating, nickel plating, etc. may be mentioned. Alloy plating of these is also possible. When the metal sheet is a steel sheet, hot rolled steel sheet, cold rolled steel sheet, and hot dip galvanized steel sheet, electrogalvanized steel sheet, zinc-nickel alloy plated steel sheet, hot dip galvannealed steel sheet, aluminum plated steel sheet, aluminum-zinc alloy plated steel sheet, stainless steel sheet, or other generally known steel sheet and plated steel sheet may be used. Here, the "galvanized steel sheet" indicates hot-dip galvanized steel sheet, electrogalvanized steel sheet, or other galvanized steel sheet, zinc-nickel alloy plated steel sheet, hot dip galvannealed steel sheet, aluminum-zinc alloy plated steel sheet, and other alloy plated steel sheet of zinc and other metals. Among these galvanized steel sheets, hot-dip galvanized steel sheets, electrogalvanized steel sheets, and other galvanized steel sheets have a large sacrificial corrosion prevention effect and excellent corrosion resistance and, further, are excellent in productivity and cost, so are more preferable.

If applying a generally known chemical conversion treatment to the surface of a metal sheet, the adhesion of the metal sheet and the coating layer is improved, so this is more preferable. As this chemical conversion treatment, it is possible to use a zinc phosphate type chemical conversion treatment, coated chromate treatment, electrolytic chromate treatment, reactive chromate treatment, chromate-free chemical treatment, etc. As the chromate-free chemical treatment, it is known to use a silane coupling agent, zirconium compound, titanium compound, tannin or tannic acid, resin, silica, etc. in an aqueous solution for treatment. The known art described in Japanese Patent Publication (A) No. 53-9238, Japanese Patent Publication (A) No. 9-241576, Japanese Patent Publication (A) No. 2001-89868, Japanese Patent Publication (A) No. 2001-316845, Japanese Patent Publication (A) No. 2002-60959, Japanese Patent Publication (A) No. 2002-38280, Japanese Patent Publication (A) No. 2002-266081, Japanese Patent Publication (A) No. 2003-353464, etc. may also be used. For these chemical conversion treatments, it is also possible to use a commercially available agent, for example, the chromate-free chemical conversion agent "CT-E300N" made by Japan Parkerizing, the trivalent chrome-based chemical treatment coating "Surfcoat NRC1000" made by Nippon Paint, etc.

The surface-treated metal plate according to the present embodiment may be produced by multilayer simultaneous coating or wet-on-wet coating. That is, by bringing a top layer coating and bottom layer coating into contact in a liquid state, it is possible to prepare a mixed layer (diffusion layer) in which the ingredients of the layers are mixed.

When coating three or more layers in the liquid state by multilayer simultaneous coating or wet-on-wet coating, any layers above and below an interface where the layers contact may be deemed the top layer and the bottom layer in the same way as the present embodiment.

The substance with a surfactant action which is included in the top and bottom layers may be any substance which has hydrophobic parts and hydrophilic parts. For example, a polyvinyl alcohol, polyethylene glycol, or other resin or composites of the same, commercially available leveling agents, surfactants, defoamers, resin dispersants, etc. may be mentioned, but others may also be used.

The "multilayer simultaneous coating" is the method of using a slot die coater or a slide hopper type curtain coater etc. to simultaneously laminate a plurality of layers of coatings on a base material then simultaneously dry and bake the coating applied by simultaneously coating the layers. Further, the "wet-on-wet coating" is the method of applying a coating once to a base material, then in the wet state before this coating dries, applying another coating over it and simultaneously drying and baking this laminated multilayer coating.

As the method of wet-on-wet coating, it is possible to use a roll coater, dipping, curtain coater, roller curtain coater, or other general known coating method to coat one coating layer, then, before drying and baking this coating layer, further use curtain roll coating, roller curtain coating, a slide hopper type curtain coater, slot die coater, or other generally known method enabling coating in a noncontact manner with the base material so as to apply a coating, then simultaneously drying and baking this laminated wet coating. Further, as a multilayer simultaneous coating method, it is possible to use a method of coating, such as use of a slide hopper type curtain coater, which discharges different coatings from two or more parallel slits etc. so as to laminate them.

To form a stable mixed layer (diffusion layer), it is preferable to control the difference ($\Delta\sigma=\sigma 2-\sigma 1$) of the surface tension ($\sigma 2$) of the bottom layer coating forming the mixed layer (diffusion layer) and the surface tension ($\sigma 1$) of the top layer coating forming the mixed layer (diffusion layer) to become 2 to 20 mN/m and to control the difference ($\Delta\phi=\phi 2-\phi 1$) of the viscosity ($\phi 2$) of the bottom layer coating forming the mixed layer (diffusion layer) and the viscosity ($\phi 1$) of the top layer coating forming the mixed layer (diffusion layer) to become −10 to 200 MPa·s. In particular, the difference ($\Delta\phi=\phi 2-\phi 1$) between the viscosity ($\phi 2$) of the bottom layer coating forming the mixed layer (diffusion layer) and the viscosity ($\phi 1$) of the top layer coating forming the mixed layer (diffusion layer) is preferably 0 to 200 mPa·s. Further, by combining the types of coatings and the coating conditions and suitably adjusting the relationship between the surface tensions and viscosities of the coatings for the top layer and bottom layer for forming the mixed layer (diffusion layer) to suitable values within the above conditions, it is possible to form a stable mixed layer (diffusion layer) and control the film thickness. By making the $\Delta\sigma$ 20 mN/m or less, formation of a sufficient thickness of a mixed layer (diffusion layer) becomes possible and the interlayer adhesion can be improved more. Further, by the $\Delta\sigma$ being 2 mN/m or more, the top layer coating and bottom layer coating become sufficient in film thickness and the performances of the top layer coating and bottom layer coating can be stably secured. Further, by the $\Delta\phi$ being −10 mPa·s or more, the top layer coating and bottom layer coating become sufficient in film thickness and the performances of the top layer coating and bottom layer coating can be more stably secured. By the $\Delta\phi$ being 0 mPa·s or more, the performances of the top layer coating and bottom layer coating can be more stably secured. Further, by $\Delta\phi$ being 200 mPa·s or less, the thickness is more than sufficient and a mixed layer (diffusion layer) can be formed, so the interlayer adhesion is improved more. Further, in the present invention, the surface tension can be measured by the platinum ring method at 20° C. Further, the viscosity can be measured using a B-type viscometer at 20° C. It is more preferable if the surface tensions of the top layer and bottom layer are 20 to 50 mN/m. If smaller than 20 mN/m, bubbles will easily enter into the coating solution, while if larger than 50 mN/m, shrinkage of the coating solution will occur and sufficient coverage will not be possible.

Further, to form the coating of the present embodiment, it is more preferable to use a coating with a low viscosity of 250 mPa or less for both the coating for the top layer coating and the coating for the bottom layer coating. By using a low viscosity coating to increase the diffusion speed of the ingredients of the coating for the top layer coating and the ingredients of the coating for the bottom layer coating, it is possible to form a mixed layer (diffusion layer).

As the coating layer used for the surface-treated metal plate according to the present embodiment, it is possible to use a generally known coating, for example, a polyester resin-based, epoxy resin-based, urethane resin-based, olefin resin-based, acrylic resin-based, melamine resin-based, or other coating alone or in combinations of two or more types. The polyester resin used may be a generally known type. As commercially available ones, for example, the "Vylon® series" or "Vylonal® series" made by Toyobo, the "Desmophen® series" made by Sumitomo-Bayer Urethane, etc. may be used. As the epoxy resin, the "jER®" made by Japan Epoxy Resin, the "EPICLON® series" made by DIC, etc. may be used. As the urethane resin, the "Byhydrol® series" made by Sumitomo-Bayer Urethane, the "Cosmonet® series" made by Mitsui Chemical, the "Hicell® series" made by Toho Chemical Industry, the "Bonding® series" made by DIC, etc. may be used. As the olefin resin, the "Hitech® series" made by Toho Chemical Industry etc. may be used. As the acrylic resin, the "Acrydic® series" made by DIC, the acrylic resin "Acryset® series" made by Nippon Shokubai, etc. may be used. As the melamine resin, it is possible to use the melamine resin "Cymel® series" or "Mycoat® series" made by Mitsui Cytec, "Beckamine® series" and "Super Beckamine® series" made by DIC, etc.

To adjust the surface tension of the coating, it is preferable to utilize a surfactant (including a defoamer or a leveling agent). A known surfactant may be used. As commercially available ones, BYK-333 and BYK-307 made by BYK, Ermagen made by Kao, etc. are known, but there are innumerable others as well. It may be suitably added in accordance with the coating. Further, a method of adjustment other than use of a surfactant such as dilution or mixing in another solvent may also be used. Further, if the surface tension is too great, there is a possibility of the coatability becoming poor, so the surface tension is preferably made 50 mN/m or less for both the top layer coating and the bottom layer coating.

To adjust the viscosity of the coating, it is preferable to utilize a thickening agent (including a rheology modifier and viscosity modifier). A known thickening agent may be used. As commercially available ones, BYK-411, BYK-425, etc. made by BYK are known, but there are innumerable others as well. It may be suitably added in accordance with the coating. Further, a method of adjustment other than use of a thickening agent such as dilution or mixing in another solvent or increasing the ratio of solid content may also be used.

Further, to form the coating of the present embodiment, it is more preferable to use a coating with a low viscosity of 250 mPa or less for both the coating for the top layer coating and the coating for the bottom layer coating. By using a low viscosity coating to increase the diffusion speed of the ingredients of the coating for the top layer coating and the ingredients of the coating for the bottom layer coating, it is possible to form a mixed layer (diffusion layer).

The surface-treated metal plate of the present embodiment may be optionally provided with different coating layers at the further top layer from the top layer coating of the present embodiment or at the further bottom layer from the bottom layer coating so as to impart further performance.

When the metal sheet of the present embodiment is a galvanized steel sheet, by producing it by a line in a continuous electroplated steel sheet facility or a continuous hot-dip coated steel sheet facility in which a wet-on-wet coating facility or a simultaneous multilayer coating facility is provided after the plating step, it is possible to coat the metal sheet before forming the oxide coating on the plated metal surface so defects in appearance of dewetting due to the oxide coating do not occur. Further, it is also possible to eliminate the step of baking the bottom layer coating, improve the productivity of the coating line, and slash the production costs.

As the method of curing the resin used, it is possible to use a hot air oven, direct fired type oven, far infrared ray oven, induction heating type oven, or other generally known drying and baking method.

EXAMPLES

Example 1

Below, details of Example 1 will be described.
1. Metal Base Sheet

The hot-dip galvanized steel sheet "Silverzinc®" (hereinafter referred to as "GI") made by Nippon Steel Corporation, the electrogalvanized steel sheet "Zincoat®" (hereinafter referred to as "EG") made by NIPPON STEEL CORPORATION, the zinc-nickel alloy plated steel sheet "Zincrite®" (hereinafter referred to as "ZL") made by NIPPON STEEL CORPORATION, aluminum sheet "JIS3004" (hereinafter referred to as "Al"), and stainless steel sheet "SUS430" (hereinafter referred to as "SUS") were used as the base sheets. Ones of a sheet thickness of 0.6 mm were used.

2. Bottom Layer Coating
Resin A:
The polyolefin resin "Hitec AR-2300" made by Toho Chemical Industry was used.
Resin B:
The acrylic resin "ACRYDIC A-405" made by DIC was used.
Resin C:
The aqueous dispersion polyester resin "Vylonal MD-1400" made by Toyobo was used.

Si-Containing Rust Preventative
The silica "AEROSIL®200" (average particle size: about 12 nm) made by Nippon Aerosil was used.
P-Containing Rust Preventative
The reagent magnesium dihydrogen phosphate (Kanto Chemical) was used.
V-Containing Rust Preventative
The reagent vanadium oxide (Kanto Chemical) was used.
These resins and pigments were blended in the combinations shown in Table 1 to prepare coatings. The rust preventive was added in an amount of 1 part by mass with respect to the resin solids.

TABLE 1

| Bottom layer coating no. | Resin name | Additives |
|---|---|---|
| Bottom layer coating 1 | Resin A | Nothing added |
| Bottom layer coating 2 | Resin A | P contained |
| Bottom layer coating 3 | Resin A | V contained |
| Bottom layer coating 4 | Resin B | Si contained |
| Bottom layer coating 5 | Resin C | V contained |

3. Top Layer Coating
Resin D:
The aqueous polyurethane "Bihydrol PR135" made by Sumitomo Bayer Urethane was used.
Resin E:
The epoxy resin "jER® Series W1144R55" made by Japan Epoxy Resin was used.
Ti-Containing Rust Preventative
Titanium chloride (III) (Kanto Chemical) were used.
V-Containing Rust Preventative
The reagent palladium chloride (Kanto Chemical) was used.

These resins and pigments were blended in the combinations shown in Table 2 to prepare coatings. The rust preventive was added in an amount of 1 part by mass with respect to 100 parts by mass of the resin solids.

TABLE 2

| Top layer coating no. | Resin name | Additives |
|---|---|---|
| Top layer coating 1 | Resin D | Nothing added |
| Top layer coating 2 | Resin E | Ti contained |
| Top layer coating 3 | Resin E | V contained |

4. Preparation of Coating

To the coatings of the top layer and bottom layer, a surfactant BYK-333 (made by BYK) or BYK-307 (made by BYK) and a thickening agent BYK-425 (made by BYK) were added to adjust the surface tension and the viscosity. To prevent any effect on the coating performance after formation, the amounts of addition of the surfactant and the thickening agent were made concentrations with respect to the coating of 1.0 mass % or less. The surface tension was measured using a Dynometer made by BYK by the platinum ring method at 20° C. The viscosity was measured using a B-type viscometer (made by Tokyo Keiki) at 20° C. The value of the (surface tension of bottom layer: σ2)–(surface tension of top layer: σ1) is shown by Δσ and the value of the (viscosity of bottom layer: φ2)–(viscosity of top layer: φ1) is shown by Δφ. Further, the surface tension was adjusted, so as not to impair the coatability, to 20 to 50 mN/m in range so that the viscosity was 1 to 250 mPa in range and satisfied the conditions of the present application.

5. Preparation of Test Plate

The various metal sheets were dipped in an FC-4336 aqueous solution of a temperature of 60° C. and a concentration 2 mass % (made by Japan Parkerizing) for 10 seconds to degrease them, then were rinsed and dried.

The metal sheet was simultaneously laminated and coated with layers of a bottom layer coating and a top layer coating by a slide hopper type curtain coater and was simultaneously dried and baked in an induction heating furnace in which hot air was blown under conditions of a peak sheet temperature of the metal sheet of 180° C. and then was water cooled to obtain the test plate (the precoated steel plate which was prepared by this method will hereinafter be referred to as the "2-coat 1-bake" or "2C1B").

The metal sheet was coated with a bottom layer coating by a roll coater, then was coated wet-on-wet by a top layer coating by a slide hopper type curtain coater. The laminated coating was simultaneously dried and baked in an induction heating furnace in which hot air was blown under conditions of a peak sheet temperature of the metal sheet of 180° C. and then was water cooled to obtain the test plate (the precoated steel plate which was prepared by this method will hereinafter be referred to as the "wet-on-wet 2 coat 1-bake" or "WOW2C1B").

Further, the metal sheet was coated by a bottom layer coating by a roll coater and was simultaneously dried and baked in an induction heating furnace in which hot air was blown under conditions of a peak sheet temperature of the metal sheet of 180° C. and then was water cooled, then was coated on top of this with a top layer coating by a roll coater and was simultaneously dried and baked in an induction heating furnace in which hot air was blown under conditions of a peak sheet temperature of the metal sheet of 180° C. and then was water cooled to obtain the test plate (the precoated steel plate which was prepared by this method will hereinafter be referred to as the "2-coat 2-bake" or "2C2B").

Further, the bottom layer coating or top layer coating was coated by a roll coater and was simultaneously dried and baked in an induction heating furnace in which hot air was blown under conditions of a peak sheet temperature of the metal sheet of 180° C. and then was water cooled to obtain the test plate (the precoated steel plate which was prepared by this method will hereinafter be referred to as the "1-coat 1-bake" or "1C1B").

The total film thickness T was found from a photograph obtained by observation through an electron microscope. The top layer film thickness, the bottom layer film thickness, and the mixed layer (diffusion layer) film thickness were found by using a System 3860 made by Rigaku Corporation to measure the spectral intensities of Si, P, V, and Ti in the depth direction of the coating under the conditions of a discharge power of 30 W and an argon flow rate of 250 ml/min and converting the sampling time to the film thickness from the relationship of the sampling time and total film thickness.

The interface of the top layer and the mixed layer (diffusion layer) is considered to exhibit a concentration of 2 mass % with respect to the maximum Si concentration or P concentration, V concentration, and Ti concentration, while the interface of the mixed layer (diffusion layer) and the bottom layer is considered to exhibit a concentration of 98 mass % with respect to the maximum Si concentration or P concentration, V concentration, and Ti concentration. Due to this, the top layer film thickness, mixed layer (diffusion layer) film thickness, and bottom layer film thickness were found. The prepared test plates were summarized in Table 3.

TABLE 3

| No. | Metal sheet | Bottom layer Coating | Thickness (μm) | Mixed layer (diffusion layer) Thickness (μm) | Top layer Coating | Thickness (μm) | Total film thickness T (μm) | t/T | Coating method | Δσ (mN/m) | Δφ (mPa·s) | Remarks |
|---|---|---|---|---|---|---|---|---|---|---|---|---|
| 1-1 | EG | Bottom layer coating 2 | 3.2 | 1.2 | Top layer coating 1 | 1.6 | 6 | 0.2 | 2C1B | 20 | 200 | Inv. ex |
| 1-2 | EG | Bottom layer coating 2 | 1.5 | 1.8 | Top layer coating 1 | 2.7 | 6 | 0.3 | 2C1B | 15 | 120 | Inv. ex |
| 1-3 | EG | Bottom layer coating 2 | 2.4 | 2.4 | Top layer coating 1 | 1.2 | 6 | 0.4 | 2C1B | 15 | 30 | Inv. ex |
| 1-4 | EG | Bottom layer coating 2 | 2 | 3 | Top layer coating 1 | 1 | 6 | 0.5 | 2C1B | 10 | 15 | Inv. ex |
| 1-5 | EG | Bottom layer coating 2 | 1 | 3.6 | Top layer coating 1 | 1.4 | 6 | 0.6 | 2C1B | 7 | 10 | Inv. ex. |
| 1-6 | EG | Bottom layer coating 2 | 0.5 | 4.2 | Top layer coating 1 | 1.3 | 6 | 0.7 | 2C1B | 5 | 5 | Inv. ex. |
| 1-7 | EG | Bottom layer coating 2 | 0.8 | 4.8 | Top layer coating 1 | 0.4 | 6 | 0.8 | 2C1B | 4 | −5 | Inv. ex. |
| 1-8 | EG | Bottom layer coating 1 | 2 | 3 | Top layer coating 2 | 1 | 6 | 0.5 | 2C1B | 10 | 15 | Inv. ex. |
| 1-9 | GI | Bottom layer coating 2 | 2 | 3 | Top layer coating 1 | 1 | 6 | 0.5 | 2C1B | 10 | 15 | Inv. ex. |
| 1-10 | EG | Bottom layer coating 3 | 2 | 3 | Top layer coating 1 | 1 | 6 | 0.5 | 2C1B | 10 | 15 | Inv. ex. |
| 1-11 | EG | Bottom layer coating 4 | 2 | 3 | Top layer coating 1 | 1 | 6 | 0.5 | 2C1B | 10 | 15 | Inv. ex. |
| 1-12 | EG | Bottom layer coating 5 | 2 | 3 | Top layer coating 1 | 1 | 6 | 0.5 | 2C1B | 10 | 15 | Inv. ex. |
| 1-13 | EG | Bottom layer coating 2 | 0.2 | 0.5 | Top layer coating 1 | 0.3 | 1 | 0.5 | 2C1B | 10 | 15 | Inv. ex. |
| 1-14 | GI | Bottom layer coating 2 | 0.5 | 1.5 | Top layer coating 1 | 1 | 3 | 0.5 | 2C1B | 10 | 15 | Inv. ex. |
| 1-15 | GI | Bottom layer coating 2 | 1.8 | 3 | Top layer coating 1 | 1.2 | 6 | 0.5 | 2C1B | 10 | 15 | Inv. ex. |
| 1-16 | GI | Bottom layer coating 2 | 2 | 4 | Top layer coating 1 | 2 | 8 | 0.5 | 2C1B | 10 | 15 | Inv. ex. |
| 1-17 | GI | Bottom layer coating 2 | 3 | 5 | Top layer coating 1 | 2 | 10 | 0.5 | 2C1B | 10 | 15 | Inv. ex. |
| 1-18 | GI | Bottom layer coating 2 | 5.3 | 5.5 | Top layer coating 1 | 0.2 | 11 | 0.5 | 2C1B | 10 | 15 | Inv. ex. |
| 1-19 | GI | Bottom layer coating 2 | 3 | 7.5 | Top layer coating 1 | 4.5 | 15 | 0.5 | 2C1B | 10 | 15 | Inv. ex. |
| 1-20 | GI | Bottom layer coating 2 | 5 | 10 | Top layer coating 1 | 5 | 20 | 0.5 | 2C1B | 10 | 15 | Inv. ex. |
| 1-21 | GI | Bottom layer coating 2 | 6.5 | 10.5 | Top layer coating 1 | 4 | 21 | 0.5 | 2C1B | 10 | 15 | Inv. ex. |
| 1-22 | GI | Bottom layer coating 2 | 6.5 | 11.5 | Top layer coating 1 | 5 | 23 | 0.5 | 2C1B | 10 | 15 | Inv. ex. |
| 1-23 | GI | Bottom layer coating 2 | 0.1 | 7 | Top layer coating 1 | 8.3 | 14 | 0.5 | 2C1B | 10 | 15 | Inv. ex. |
| 1-24 | GI | Bottom layer coating 2 | 8.3 | 7 | Top layer coating 1 | 0.1 | 14 | 0.5 | 2C1B | 10 | 15 | Inv. ex. |
| 1-25 | GI | Bottom layer coating 2 | 2 | 3 | Top layer coating 3 | 1 | 6 | 0.5 | 2C1B | 10 | 15 | Inv. ex. |
| 1-26 | GI | Bottom layer coating 2 | 1 | 4 | Top layer coating 1 | 1 | 6 | 0.7 | 2C1B | 0 | 15 | Inv. ex. |
| 1-27 | GI | Bottom layer coating 2 | 4 | 2 | Top layer coating 1 | 1 | 7 | 0.3 | 2C1B | 22 | 15 | Inv. ex. |
| 1-28 | GI | Bottom layer coating 2 | 1 | 4.5 | Top layer coating 1 | 1 | 6.5 | 0.7 | 2C1B | 5 | −15 | Inv. ex. |
| 1-29 | GI | Bottom layer coating 2 | 4 | 2 | Top layer coating 1 | 1 | 7 | 0.3 | 2C1B | 5 | 220 | Inv. ex. |
| 1-30 | ZL | Bottom layer coating 2 | 2 | 3 | Top layer coating 1 | 1 | 6 | 0.5 | 2C1B | 10 | 15 | Inv. ex. |
| 1-31 | Al | Bottom layer coating 2 | 2 | 3 | Top layer coating 1 | 1 | 6 | 0.5 | 2C1B | 10 | 15 | Inv. ex. |
| 1-32 | SUS | Bottom layer coating 2 | 2 | 3 | Top layer coating 1 | 1 | 6 | 0.5 | 2C1B | 10 | 15 | Inv. ex. |
| 1-33 | EG | Bottom layer coating 2 | 2 | 3 | Top layer coating 1 | 1 | 6 | 0.5 | WOW2C1B | 10 | 15 | Inv. ex. |
| 1-34 | SUS | Bottom layer coating 2 | 5.3 | 5.5 | Top layer coating 1 | 0.2 | 11 | 0.5 | 2C1B | 10 | 15 | Inv. ex. |
| 1-35 | EG | Bottom layer coating 2 | 5.3 | 5.5 | Top layer coating 1 | 0.2 | 11 | 0.5 | WOW2C1B | 10 | 15 | Inv. ex. |
| 1-36 | EG | Bottom layer coating 2 | 2 | 0 | — | — | 2 | 0 | 1C1B | — | — | Comp. ex. |

TABLE 3-continued

| No. | Metal sheet | Bottom layer Coating | Thickness (μm) | Mixed layer (diffusion layer) Thickness (μm) | Top layer Coating | Thickness (μm) | Total film thickness T (μm) | t/T | Coating method | Δσ (mN/m) | Δφ (mPa·s) | Remarks |
|---|---|---|---|---|---|---|---|---|---|---|---|---|
| 1-37 | EG | — | — | — | Top layer coating 1 | 2 | 2 | 0 | 1C1B | — | — | Comp. ex. |
| 1-38 | EG | Bottom layer coating 2 | 3.5 | 0 | Top layer coating 1 | 2.5 | 6 | 0 | 2C2B | 2 | 5 | Comp. ex. |
| 1-39 | EG | Bottom layer coating 2 | 0.2 | 5.4 | Top layer coating 1 | 0.4 | 6 | 0.9 | 2C1B | −5 | −20 | Comp. ex. |

The thus prepared test plates were evaluated and tested as follows:

1. Interlayer Adhesion Test

A grid of 100 pieces of 1 mm square each was cut into the coated surface to reach the base material then was peeled by Cellotape®. The number of remaining grid pieces of the bottom layer coating after tape peeling was used to evaluate the adhesion by the following ranks. The pieces stuck to the Cellotape® and the test plates after peeling were stained by Methyl Violet. Since the stained pieces matched, it was learned that there was no peeling of both the top layer coating and the bottom layer coating and that in the case of peeling, the peeling occurred between the top layer and the bottom layer.

Very good: 100 remaining grid pieces
Good: 95 or more remaining grid pieces
Fair: 80 or more remaining grid pieces
Poor: Less than 80 remaining grid pieces 2. Alkali Resistance Test The test plate was dipped in a 55° C. alkali degreasing agent (Surfcleaner 53, made by Nippon Paint) 2% aqueous solution (pH12.5), while stirring, for 30 minutes, then was examined for coating state and evaluated for remaining coating area % by the following criteria.

Very good: No peeling
Good: Peeling of less than 10%
Fair: Peeling of less than 50%
Poor: Peeling of 50% or more 3. Workability Test The test plate was extruded 8 mm by an Erichsen tester, then Cellophane® tape (made by Nichiban) was adhered to the extruded part and forcibly peeled off. The case of no peeling was evaluated as "Good", the case of peeling was evaluated as "Fair", and the case of "Complete peeling" was evaluated as "Poor".

4. Corrosion Resistance Test

The edges and back surface of the test plate were sealed by tape and an SST (JIS-Z-2371) test was run. After 72 hours, the state of formation of white rust was observed. The area % of formation of white rust was evaluated by the following criteria.

Good: No white rusting
Fair: White rusting of less than 10%
Poor: White rusting of 10% or more 5. Evaluation of Appearance Test plates with a beautiful appearance were evaluated as "Good", while test plates with uneven appearance were evaluated as "Poor".

The test results will be explained in detail.

Table 4 shows the results of evaluation of the prepared metal sheets.

With a single-layer coating (Nos. 1-36 and 1-37), the test plate is inferior in alkali resistance or is inferior in corrosion resistance. A metal sheet of the present invention designed with these coatings at the top and bottom layers is excellent in interlayer adhesion, alkali resistance, workability, corrosion resistance, and appearance. The features are particularly excellent in the range of 0.4≤t/T≤0.6. This is more preferable.

When the bottom layer does not include a rust-preventive pigment, the corrosion resistance tends to become slightly inferior compared with a surface-treated metal plate where the bottom layer includes a rust-preventative pigment (No. 1-8).

The test plate with a top layer of less than 0.2 μm (No. 1-24) tended to be slightly inferior in the alkali resistance of the performance of the top layer. 0.2 μm or more is suitable. A test plate with a bottom layer of less than less than 0.2 μm (No. 1-23) tended to be slightly inferior in the corrosion resistance of the performance of the bottom layer. 0.2 μm or more is suitable.

At the test plates with a total film thickness of over 20 μm (Nos. 1-21 and 1-22), popping were seen. 20 μm or less is suitable. The test plate with a top layer with a rust preventative added (No. 25) tended to be inferior in alkali resistance. It is preferable to add a rust preventative to only the bottom layer.

The test plate with a Δσ larger than 20 mN/m (No. 1-27) was inferior in interlayer adhesion. Further, the test plate with a Δσ smaller than 2 mN/m was slightly inferior in performance (No. 1-26).

The test plate with a Δφ smaller than −10 mPa·s (No. 1-28) was slightly inferior in performance. The test plate with a Δφ larger than 200 mPa·s (No. 1-29) was slightly inferior in interlayer adhesion.

On the other hand, the test plate not formed with a mixed layer (diffusion layer) (No. 1-38) was inferior in interlayer adhesion and workability and unsuitable. Further, the test plate with a large ratio of the mixed layer (diffusion layer) film thickness in the total film thickness (No. 1-39) was slightly inferior in workability and corrosion resistance and was uneven in appearance so was unsuitable.

TABLE 4

| No. | Interlayer adhesion | Alkali resistance | Workability | Corrosion resistance | Appearance |
|---|---|---|---|---|---|
| 1-1 | Good | Very good | Good | Good | Good |
| 1-2 | Good | Very good | Good | Good | Good |
| 1-3 | Very good | Very good | Good | Very good | Good |

TABLE 4-continued

| No. | Interlayer adhesion | Alkali resistance | Workability | Corrosion resistance | Appearance |
|---|---|---|---|---|---|
| 1-4 | Very good | Very good | Good | Very good | Good |
| 1-5 | Very good | Very good | Good | Very good | Good |
| 1-6 | Very good | Good | Good | Good | Good |
| 1-7 | Very good | Good | Good | Good | Good |
| 1-8 | Very good | Very good | Good | Good | Good |
| 1-9 | Very good | Very good | Good | Very good | Good |
| 1-10 | Very good | Very good | Good | Very good | Good |
| 1-11 | Very good | Very good | Good | Very good | Good |
| 1-12 | Very good | Very good | Good | Very good | Good |
| 1-13 | Very good | Very good | Good | Very good | Good |
| 1-14 | Very good | Very good | Good | Very good | Good |
| 1-15 | Very good | Very good | Good | Very good | Good |
| 1-16 | Very good | Very good | Good | Very good | Good |
| 1-17 | Very good | Very good | Good | Very good | Good |
| 1-18 | Very good | Very good | Good | Very good | Good |
| 1-19 | Very good | Very good | Good | Very good | Good |
| 1-20 | Very good | Very good | Good | Very good | Good |
| 1-21 | Very good | Very good | Good | Very good | Good (popping) |
| 1-22 | Very good | Very good | Good | Very good | Good (popping) |
| 1-23 | Very good | Very good | Good | Good | Good |
| 1-24 | Very good | Good | Good | Very good | Good |
| 1-25 | Very good | Good | Good | Very good | Good |
| 1-26 | Very good | Good | Good | Good | Good |
| 1-27 | Good | Very good | Good | Good | Good |
| 1-28 | Very good | Good | Good | Good | Good |
| 1-29 | Good | Very good | Good | Good | Good |
| 1-30 | Very good | Very good | Good | Very good | Good |
| 1-31 | Very good | Very good | Good | Very good | Good |
| 1-32 | Very good | Very good | Good | Very good | Good |
| 1-33 | Very good | Very good | Good | Very good | Good |
| 1-34 | Very good | Very good | Good | Very good | Good |
| 1-35 | Very good | Very good | Good | Very good | Good |
| 1-36 | — | Poor | Good | Very good | Good |
| 1-37 | — | Very good | Good | Poor | Good |
| 1-38 | Poor | Very good | Poor | Good | Good |
| 1-39 | Good | Poor | Good | Poor | Poor |

Example 2

1. Metal Base Sheet

The hot-dip galvanized steel sheet "Silverzinc®" (hereinafter referred to as "GI") made by NIPPON STEEL CORPORATION was used as the base sheet. One of a sheet thickness of 0.6 mm was used.

2. Bottom Layer Coating

A bottom layer coating 2 the same as in Example 1 was used.

3. Top Layer Coating

As the resins, the resin B and the resin D the same as in Example 1, and the resin F and the resin G shown below were used.

Resin F:

The silicone resin "Silicone Smile Clean" made by DNT was used.

Resin G:

The aqueous dispersion polyester resin "Vylonal MD-1200" made by Toyobo was used.

These resins and pigments were blended in the combinations shown in Table 5 to prepare coatings. The pigment concentrations were as follows:

The carbon black "AF Black" made by Dainichi Seika Color & Chemicals Manufacturing was added in an amount of 50 parts by mass with respect to the resin solids.

The fluorine resin "FLUON PTFE" made by AGC was added in amounts of 5 and 20 parts by mass with respect to the resin solids.

TABLE 5

| Top layer coating no. | Resin name | Additives |
|---|---|---|
| Top layer coating 4 | Resin B | Not yet added |
| Top layer coating 5 | Resin D | AF Black 5% |
| Top layer coating 6 | Resin D | AF Black 20% |
| Top layer coating 7 | Resin F | Not yet added |
| Top layer coating 8 | Resin G | FLUON 5% |
| Top layer coating 9 | Resin G | FLUON 20% |

4. Preparation of Coating

The coating was prepared in the same way as in Example 1.

5. Preparation of Test Plate

The various metal sheets were dipped in an FC-4336 aqueous solution of a temperature of 60° C. and a concentration 2 mass % (made by Japan Parkerizing) for 10 seconds to degrease them, then were rinsed and dried.

The metal sheet was simultaneously laminated and coated with layers of a bottom layer coating and a top layer coating by a slide hopper type curtain coater and was simultaneously dried and baked in an induction heating furnace in which hot air was blown under conditions of a peak sheet temperature of the metal sheet of 180° C. and then was water cooled to obtain the test plate (the precoated steel plate which was prepared by this method will hereinafter be referred to as the "2-coat 1-bake" or "2C1B").

Further, the metal sheet was coated by a bottom layer coating by a roll coater and was simultaneously dried and baked in an induction heating furnace in which hot air was blown under conditions of a peak sheet temperature of the metal sheet of 180° C. and then was water cooled, then was coated on top of this with a top layer coating by a roll coater and was simultaneously dried and baked in an induction heating furnace in which hot air was blown under conditions of a peak sheet temperature of the metal sheet of 180° C. and then was water cooled to obtain the test plate (the precoated steel plate which was prepared by this method will hereinafter be referred to as the "2-coat 2-bake" or "2C2B").

Further, the bottom layer coating or top layer coating was coated by a roll coater and was simultaneously dried and baked in an induction heating furnace in which hot air was blown under conditions of a peak sheet temperature of the metal sheet of 180° C. and then was water cooled to obtain the test plate (the precoated steel plate which was prepared by this method will hereinafter be referred to as the "1-coat 1-bake" or "1C1B").

The total film thickness T was found from a photograph obtained by observation through an electron microscope. The top layer film thickness, the bottom layer film thickness, and the mixed layer (diffusion layer) film thickness were found by using a System 3860 made by Rigaku Corporation to measure the spectral intensity of P in the depth direction of the coating under the conditions of a discharge power of 30 W and an argon flow rate of 250 ml/min and converting the sampling time to the film thickness from the relationship of the sampling time and total film thickness.

The interface between the top layer and the mixed layer (diffusion layer) is considered to exhibit a concentration of 2 mass % of P compared with the maximum concentration, while the interface between the mixed layer (diffusion layer) and the bottom layer is considered to exhibit a concentration of 98 mass % of P compared with the maximum concentration. Due to this, the top layer film thickness, the mixed layer (diffusion layer) film thickness, and the bottom layer film thickness were found. The prepared test plates are summarized in Table 6.

TABLE 6

| No. | Bottom layer Coating | Bottom layer Thickness (μm) | Mixed layer (diffusion layer) Thickness t (μm) | Top layer Coating | Top layer Thickness (μm) | Total film thickness T (μm) | t/T | Coating method | Δσ (mN/m) | Δφ (mPa·s) |
|---|---|---|---|---|---|---|---|---|---|---|
| 2-1 | Bottom layer coating 2 | 1.0 | 3.6 | Top layer coating 4 | 1.4 | 6.0 | 0.6 | 2C1B | 7 | 10 |
| 2-2 | Bottom layer coating 2 | 1.0 | 3.6 | Top layer coating 5 | 1.4 | 6.0 | 0.6 | 2C1B | 7 | 10 |
| 2-3 | Bottom layer coating 2 | 1.0 | 3.6 | Top layer coating 6 | 1.4 | 6.0 | 0.6 | 2C1B | 7 | 10 |
| 2-4 | Bottom layer coating 2 | 1.0 | 3.6 | Top layer coating 7 | 1.4 | 6.0 | 0.6 | 2C1B | 7 | 10 |
| 2-5 | Bottom layer coating 2 | 1.0 | 3.6 | Top layer coating 8 | 1.4 | 6.0 | 0.6 | 2C1B | 7 | 10 |
| 2-6 | Bottom layer coating 2 | 1.0 | 3.6 | Top layer coating 9 | 1.4 | 6.0 | 0.6 | 2C1B | 7 | 10 |
| 2-7 | — | — | — | Top layer coating 4 | 6.0 | 6.0 | 0 | 1C1B | — | — |
| 2-8 | — | — | — | Top layer coating 5 | 6.0 | 6.0 | 0 | 1C1B | — | — |
| 2-9 | — | — | — | Top layer coating 6 | 6.0 | 6.0 | 0 | 1C1B | — | — |
| 2-10 | — | — | — | Top layer coating 7 | 6.0 | 6.0 | 0 | 1C1B | — | — |
| 2-11 | — | — | — | Top layer coating 8 | 6.0 | 6.0 | 0 | 1C1B | — | — |
| 2-12 | — | — | — | Top layer coating 9 | 6.0 | 6.0 | 0 | 1C1B | — | — |
| 2-13 | Bottom layer coating 2 | 1.0 | — | — | — | 1.0 | 0 | 1C1B | — | — |
| 2-14 | Bottom layer coating 2 | 2.5 | 0 | Top layer coating 4 | 3.5 | 6.0 | 0 | 2C2B | 7 | 10 |
| 2-15 | Bottom layer coating 2 | 2.5 | 0 | Top layer coating 5 | 3.5 | 6.0 | 0 | 2C2B | 7 | 10 |
| 2-16 | Bottom layer coating 2 | 2.5 | 0 | Top layer coating 6 | 3.5 | 6.0 | 0 | 2C2B | 7 | 10 |
| 2-17 | Bottom layer coating 2 | 2.5 | 0 | Top layer coating 7 | 3.5 | 6.0 | 0 | 2C2B | 7 | 10 |
| 2-18 | Bottom layer coating 2 | 2.5 | 0 | Top layer coating 8 | 3.5 | 6.0 | 0 | 2C2B | 7 | 10 |
| 2-19 | Bottom layer coating 2 | 2.5 | 0 | Top layer coating 9 | 3.5 | 6.0 | 0 | 2C2B | 7 | 10 |

The thus prepared test plates were evaluated and tested as follows:

1. Interlayer Adhesion Test

The same procedure was followed as in Example 1.

2. Stain Resistance

A volatile lubricating oil "G-6216FS" made by Nihon Kohsakuyu to which a contaminant of the commercially available carbon black was added in an amount of 20 mass % and stirred was coated on the coating surface which was then allowed to stand in a 50° C. atmosphere for 24 hours. After being allowed to stand, the coating surface was wiped with ethanol, then the appearance of the coating was visually examined. Further, the case where black contaminants were not deposited was evaluated as "Good", while the case where the coating surface layer was not stained black was evaluated as "Poor".

3. Emissivity

A Fourier transform infrared spectrophotometer "VALOR-III" made by JASCO was used to measure the infrared emission spectrum at a region of a wave number of 600 to 3000 $cm^{-1}$ when making the temperature of the prepared metal sheet 80° C. This was compared with the emission spectrum of a standard black body to measure the total emissivity of the metal sheet. Note that, the standard black body used was an iron sheet spray coated by a "THI-1B Black Body Sprayer" made by Okitsumo Inc. (available from Tasco Japan) to a 30±2 μm film thickness.

The case of a total emissivity of 0.90 or more was evaluated as "Very good", the case of 0.70 to less than 0.90 as "Good", the case of 0.50 to less than 0.70 as "Fair", and the case of less than 0.50 as "Poor".

4. Scratch Resistance

The test plate was set in a rubbing tester, then stainless steel balls of a diameter of 10 mm were rubbed against it under conditions of a load of 4.9033N (0.5 kgf) and 1 cycle (back and forth)/sec for 5 cycles (back and forth), then the degree of scratching of the surface of the test plate was evaluated by the following criteria:

Very good: No tracks of scratches at all.
Good: Slight, but tracks of scratches remain.
Fair: Tracks of scratches remain.
Poor: Tracks of scratches with metal luster remain.

5. Chemical Resistance

The test plate was set in a rubbing tester, then absorbent cotton impregnated with ethanol was rubbed against it under conditions of a load of 49.033 kpa (0.5 kgf/$cm^2$) for 10 cycles (back and forth) and absorbent cotton impregnated with kerosene was rubbed against it under conditions of a load of 49.033 kpa (0.5 kgf/cm²) for 50 cycles (back and forth) then the state of the coating was evaluated by the following criteria:
Very good: No tracks at all on rubbed surfaces
Good: Slight tracks on rubbed surfaces
Fair: White tracks on rubbed surfaces
Poor: Coating removed from rubbed surfaces 6. Workability Test The same procedure was followed as in Example 1.

7. Corrosion Resistance Test

The same procedure was followed as in Example 1.

8. Evaluation of Appearance

The same procedure was followed as in Example 1.

The test results are described in detail. Table 7 shows the results of evaluation of the prepared metal plates.

In the surface-treated metal plates with only a single top layer coating, the workability and the corrosion resistance were inferior (Nos. 2-7 to 2-12). In the surface-treated metal plate with only a single bottom layer coating, the stain resistance, emissivity, scratch resistance, and chemical resistance were inferior (No. 2-13). The surface-treated metal plates according to the present invention were superior in workability and corrosion resistance and were superior in the stain resistance (No. 2-1), emissivity (Nos. 2-2 and 2-3), scratch resistance (No. 2-4), and chemical resistance (Nos. 2-5 and 2-6).

Further, if adding carbon black, the emissivity tended to be excellent, but the workability and the corrosion resistance tended to be inferior (Nos. 2-8 and 2-9). On the other hand, in the surface-treated metal plate according to the present invention, the workability and the corrosion resistance were all excellent (Nos. 2-2 to 2-3). If adding a fluorine resin, the chemical resistance tended to be excellent, but the workability and the corrosion resistance tended to be inferior (Nos. 2-11 and 2-12). On the other hand, in the surface-treated metal plates according to the present invention, the workability and the corrosion resistance were all excellent (Nos. 2-5 and 2-6).

The test plates prepared by 2C2B (Nos. 2-14 to 2-19) had a thickness "t" of the mixed layer (diffusion layer) of 0, that is, a t/T of 0, so the workability and the interlayer adhesion were inferior.

ings, but the present invention is not limited to these embodiments. A person having ordinary knowledge in the field of art to which the present invention belongs clearly would be able to conceive of various changes or modifications within the scope of the technical ideas described in the claims. These may naturally also be understood as belonging to the technical scope of the present invention.

The invention claimed is:

1. A surface-treated metal plate comprised of a metal sheet on one surface or both surfaces of which two or more coating layers are provided,
the surface-treated metal plate is characterized in that
the two or more coating layers are formed by water-based dispersion coatings or emulsion coatings,
a diffusion layer is formed at an interface part between a first coating layer as a top layer and a second coating layer as a bottom layer,
wherein one of the first or the second layer contains rust preventing pigments and the other does not contain rust preventing pigments,
wherein the concentration of rust preventing pigments in the diffusion layer changes from 2 mass % to 98 mass % with respect to concentration of the rust preventing pigments in the one of the first and the second layer in the film thickness direction found by analysis of the rust preventing pigments in the coating depth direction by high frequency GDS, and in that
t/T is $0.2 \leq t/T \leq 0.8$ where the film thickness of said diffusion layer is "t" and the total film thickness of said diffusion layer, said first coating layer, and said second coating layer is "T".

2. A surface-treated metal plate as set forth in claim 1, characterized in that said t/T is $0.4 \leq t/T \leq 0.6$.

3. A surface-treated metal plate as set forth in claim 1 or 2 characterized in that said total film thickness T is $1.0 \, \mu m \leq T \leq 20.0 \, \mu m$.

4. A surface-treated metal plate as set forth in claim 1, characterized in that said first coating layer has a film thickness of 0.2 μm or more.

5. A surface-treated metal plate as set forth in claim 1, characterized in that said second coating layer has a film thickness of 0.2 μm or more.

TABLE 7

| No. | Interlayer adhesion | Stain resistance | Emissivity | Scratch resistance | Chemical resistance | Workability | Corrosion resistance | Appearance |
|---|---|---|---|---|---|---|---|---|
| 2-1 | Very good | Very good | — | — | — | Very good | Very good | Good |
| 2-2 | Very good | — | Good | — | — | Very good | Very good | Good |
| 2-3 | Very good | — | Very good | — | — | Very good | Very good | Good |
| 2-4 | Very good | — | — | Very good | — | Very good | Very good | Good |
| 2-5 | Very good | — | — | — | Good | Very good | Very good | Good |
| 2-6 | Very good | — | — | — | Very good | Very good | Very good | Good |
| 2-7 | — | Very good | — | — | — | Good | Poor | Good |
| 2-8 | — | — | Good | — | — | Fair | Fair | Good |
| 2-9 | — | — | Very good | — | — | Poor | Poor | Good |
| 2-10 | — | — | — | Very good | — | Fair | Poor | Good |
| 2-11 | — | — | — | — | Good | Fair | Fair | Good |
| 2-12 | — | — | — | — | Very good | Poor | Poor | Good |
| 2-13 | — | Poor | Poor | Poor | Poor | Very good | Very good | Good |
| 2-14 | Poor | Very good | — | — | — | Poor | Very good | Good |
| 2-15 | Poor | — | Good | — | — | Poor | Very good | Good |
| 2-16 | Poor | — | Very good | — | — | Poor | Very good | Good |
| 2-17 | Poor | — | — | Very good | — | Poor | Very good | Good |
| 2-18 | Poor | — | — | — | Good | Poor | Very good | Good |
| 2-19 | Poor | — | — | — | Very good | Poor | Very good | Good |

Above, preferred embodiments of the present invention were explained in detail while referring to the attached draw- 6. A surface-treated metal plate as set forth in claim 1, characterized in that said second coating layer contains one or more types of rust preventing pigments comprised of compounds including at least one element which is selected from Si, P, and V and in that said first coating layer does not contain any compound including an element included in said second coating layer among Si, P, and V.

7. A surface-treated metal plate as set forth in claim 1, characterized in that said metal sheet is a zinc-based plated steel sheet.

8. A method of production of a surface-treated metal plate as set forth in claim 1,
said method of production of a surface-treated metal plate characterized by coating one surface or both surfaces of a metal sheet with a first coating which forms said first coating layer and a second coating which forms said second coating layer respectively by a wet-on-wet method or simultaneous multilayer coating method, and drying and baking, so as to form a diffusion layer at an interface part between said first coating layer and said second coating layer directly under the first coating layer of the front side of the sheet, wherein the ingredients of the first coating layer and the second coating layer are mixed in the diffusion layer so that the concentrations of ingredients of the first and the second layers continuously change and is characterized in that said first coating and said second coating are a water-based coating, a difference ($\Delta\sigma = \sigma2 - \sigma1$) between a surface tension ($\sigma1$) at 20° C. of said first coating and a surface tension ($\sigma2$) at 20° C. of said second coating which are measured by a platinum ring method is 2 to 20 mN/m and a difference ($\Delta\phi = \phi2 - \phi1$) between a viscosity ($\phi1$) at 20° C. of said first coating and a viscosity ($\phi2$) at 20° C. of said second coating which are measured by a B-type viscometer is −10 to 200 mPa·s.

* * * * *